United States Patent [19]
Brandin

[11] Patent Number: 5,949,592
[45] Date of Patent: Sep. 7, 1999

[54] LIGHT BASED APPARATUS AND METHOD FOR AUTOMATICALLY ADJUSTING REARVIEW MIRRORS

[76] Inventor: Börje A. Brandin, Route du Port 12A, 1009 Pully, Switzerland

[21] Appl. No.: 08/781,323

[22] Filed: Jan. 10, 1997

[51] Int. Cl.⁶ .................................. G02B 5/08; B60R 1/06
[52] U.S. Cl. .......................... 359/843; 359/872; 359/877; 359/900
[58] Field of Search .................................. 359/843, 872, 359/877, 900, 838, 839

[56] References Cited

U.S. PATENT DOCUMENTS

| | | | |
|---|---|---|---|
| 4,625,329 | 11/1986 | Ishikawa et al. | |
| 5,668,675 | 9/1997 | Fredricks | 359/843 |
| 5,694,259 | 12/1997 | Branden | 359/843 |
| 5,706,144 | 1/1998 | Branden | 359/877 |

FOREIGN PATENT DOCUMENTS

WO 96/16838  6/1996  WIPO .

Primary Examiner—Ricky D. Shafer
Attorney, Agent, or Firm—Rockey, Milnamow & Katz, Ltd.

[57] ABSTRACT

Apparatus and methods for automating the outside rearview mirror orientation of a vehicle having at least one rearview mirror. The apparatus comprises a light directing device which emits a visible light ray, orientation detectors, an electronic controller, and a mirror positioning apparatus. The light directing device comprises a pivotal tube containing a light source. The orientation detectors detect the orientation of the light ray. In one embodiment, the apparatus also comprises a distance sensor which senses the distance between the light directing device and the driver's eyes. Once the driver has manually adjusted the light directing device so as to see the light source, the driver operates a switch, which activates both the distance sensor and the orientation detector. The controller includes a microcomputer programmed to determine the desired orientation of the outside mirror and generate control signals. The positioning apparatus, which may be a servomechanism, receives the control signals and positions the outside mirror in response thereto. The distance sensor may be an infrared or ultrasound sensor mounted on the light directing device.

25 Claims, 6 Drawing Sheets

LIGHT BASED APPARATUS AND METHOD FOR AUTOMATICALLY ADJUSTING REARVIEW MIRRORS

FIELD OF THE INVENTION

This invention relates to the mechanisms and methods for adjusting rearview mirrors of vehicles.

BACKGROUND OF THE INVENTION

Motor vehicles have rearview mirrors. For comfort and safety reasons, it is important to ensure that the rearview mirrors are oriented correctly. The correct mirror orientation depends upon the position of the driver's eyes, and therefore upon the driver's body proportions and sitting habits. When a motor vehicle is driven by a number of drivers having different body proportions, such as fleet car drivers or family members, it becomes necessary for each driver to readjust the mirrors. This process is always a nuisance, and can be even of greater nuisance depending on the lighting conditions. It is harder to carry out mirror adjustments in the dark than in daylight.

There is accordingly a need for a mechanism which automates the adjustment of all rearview mirrors independently of driver lighting conditions.

SUMMARY OF THE INVENTION

The subject invention is directed towards apparatus for adjusting the orientation of at least one rearview mirror on a vehicle. The apparatus comprises light directing means movably mounted to the vehicle for directing a visible light ray at the driver's eyes, orientation detecting means coupled to the light directing means for detecting the orientation of the light ray relative to a given point and generating orientation signals correlatable therewith, control means coupled to the orientation detecting means for determining an orientation for the mirror based upon the orientation signals and vehicle parameters and generating control signals correlatable therewith, and mirror positioning means responsive to the control means for positioning the mirror to achieve the desired orientation.

The light directing means preferably comprises a light source and view restriction means, such as a non-transparent tube, for restricting the driver from viewing the light source when the light source is not directed at the driver's eyes, mounted for pivotal movement about a pivot point.

In one embodiment, the subject apparatus determines the orientation of the rearview mirror as a function of an imaginary longitudinal plane extending through the middle of the driver's seat. In another embodiment, the apparatus includes distance sensing means located proximate the light directing means for sensing the distance between the driver's eyes and the point along the path of the visible light ray and generating distance signals correlatable therewith, and the orientation is also based upon the distance signals. In yet another embodiment, the apparatus includes a second light directing means spaced from the aforesaid light directing means, and a second orientation detecting means coupled thereto.

The distance sensing means is preferably an infrared sensor mounted on the light directing means. The apparatus preferably includes a driver operable switch which activates both the distance sensor and the orientation detecting means. The control means is preferably an electronic controller comprising a microcomputer programmed to determine a directional vector normal to the plane of the mirror. The mirror positioning means may be a servomechanism coupled to the mirror.

The invention is also directed towards a method for adjusting the orientation of at least one rearview mirror on a vehicle, comprising the steps of:

(a) directing a visible light ray emanating from a light directing device movably mounted to the vehicle at a driver's eyes;

(b) detecting the orientation of the visible light ray relative to a point and generating orientation signals correlatable therewith;

(c) determining an orientation for the mirror based upon the orientation signals and vehicle parameters, and generating control signals correlatable therewith; and (d) positioning the mirror based upon the control signals to achieve the orientation.

In one embodiment, the orientation of the mirror is determined as a function of an imaginary longitudinal plane extending through the middle of the driver's seat. In another embodiment, the distance between the point and the driver's eyes is sensed and the orientation for the rearview mirror is also based on this distance. A further embodiment of the subject method includes the step of directing a light ray from a second light emitting device at the driver's eyes, instead of sensing the distance between a point and the driver's eyes.

Preferably, the orientation of the rearview mirror is determined by utilizing a parabola having a focus located at the driver's eyes and an axis parallel to a rearview vector representing a desired rearview sightline, and falling in a plane formed by the rearview vector and a vector extending between the mirror and the driver's eyes when the driver is looking at the mirror, and containing a center point of the mirror.

BRIEF DESCRIPTION OF THE DRAWINGS

The invention will now be described, with reference to the following drawings, in which.

DETAILED DESCRIPTION OF THE PREFERRED EMBODIMENTS

Figure 1:
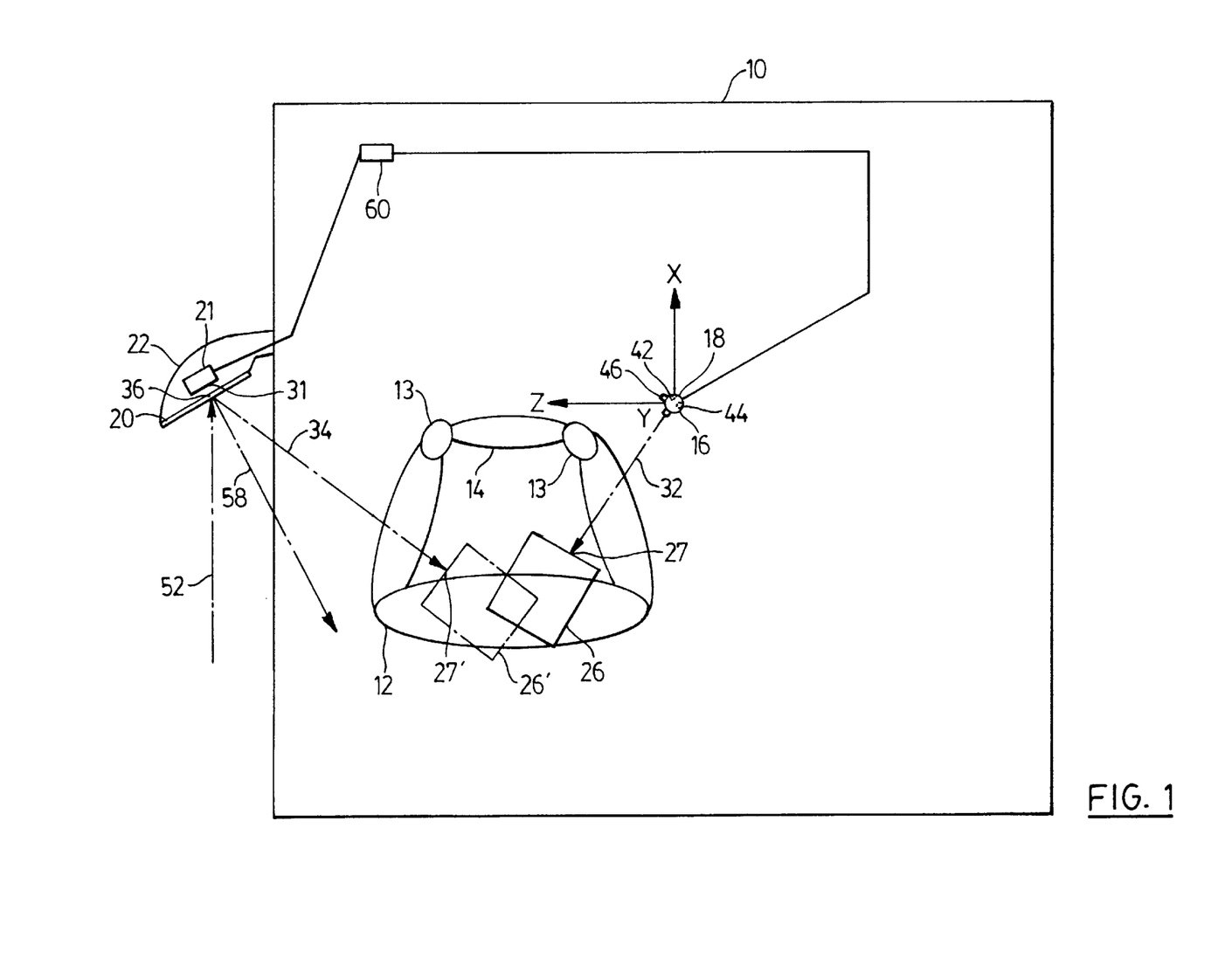
FIG. 1 is a schematic top plan view of a vehicle equipped with mirror adjustment apparatus made in accordance with a preferred embodiment of the subject invention.

FIG. 1 illustrates vehicle 10 incorporating a preferred embodiment of the subject invention. Driver 12 is shown positioned with hands 13 in a driving position behind steering wheel 14. Rearview mirror 20 is mounted in mirror housing 22 located below the lower front end of the driver's side window.

The driver's head 26 is modelled as a rectangular parallelepiped of known dimensions, of which one side corresponds to the driver's face, and rotatable and tiltable about the driver's body. The driver's eyes are modelled as two points of known position on the driver's face, and the driver's eyes center point 27 is modelled as the point midpoint between the eyes on the driver's face. When driver 12 turns his head to view mirror 20, his head assumes the position shown by dotted lines 26', and the center point of his eyes become located at point 27'. Without loss of generality, the driver's eyes center point will be used in the following, to model the driver's eyes, but each of the driver's eyes could be used instead.

In the preferred embodiment, the subject apparatus comprises manipulatable light directing device 16 mounted to vehicle 10, distance sensor 42, orientation sensors 44, activation switch 46, an electronic controller 60, and a mirror positioning servomechanism 21.

Distance sensor 42, typically an infrared or ultrasound sensor, determines the distance between the light directing device 16 and the driver's eyes' center point 27 along directed light ray 32. Orientation sensors 44 detect the orientation of light ray 32 extending from light directing device 16 to the driver's eyes' center point 27 after light directing device 16 has been manually adjusted by driver 12. Switch 46 located on mount 18 activates distance sensor 42, and orientation sensors 44.

Servomechanism 21 for positioning mirror 20 is located within mirror housing 22. Servomechanism 21 may comprise a pair of servomotors coupled together and rotatable about orthogonal axes, mechanically coupled to mirror 20 by linkages 31. Each servomotor may comprise an electric motor and a position sensor such as a potentiometer coupled to the shaft of the motor. The motion of the servomotor results in the rotation of mirror 20.

Figure 2:
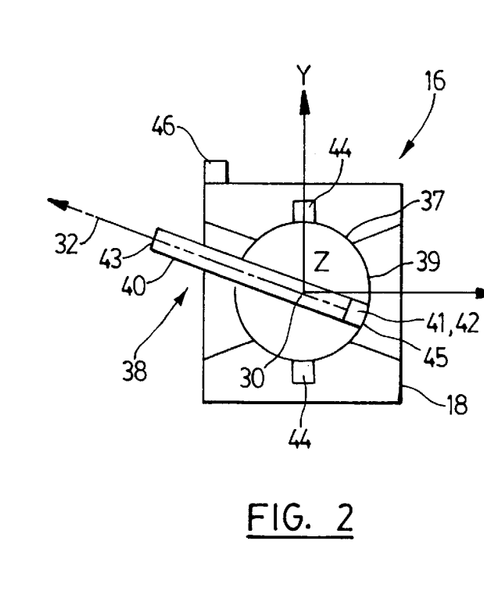
FIG. 2 is a schematic cross-sectional view of a portion of the apparatus made in accordance with the subject invention.

Referring now to FIG. 2, light directing device 16 preferably comprises light source 41 and view restriction means 38 pivotally mounted in a mount 18 for rotation about pivot point 30. View restriction means 38 is preferably a narrow non-transparent non-glossy tube 40 having a free open end 43 and a closed end 45 embedded in a spherical ball 39. Light source 41 is located inside tube 40 near closed end 45, and generates a directed light ray 32 through open end 43. Mount 18 includes socket 37 dimensioned to form a ball and socket joint with ball 39, thereby enabling tube 40 to pivot over a wide range of directions about pivot point 30. Light source 41 is preferably an LED (light emitting diode) that emits a beam of light suitable to be viewed by the driver.

Orientation sensors 44 may comprise a two degree of freedom electromechanical rotational-position sensing device able to detect the rotational movement of light directing device 16 about the Y axis and about a rotational axis orthogonal to the Y axis.

In operation, the driver looks at light directing device 16 and orients, manually or otherwise, tube 40 so as to see light ray 32 emanating from light source 41, and then presses switch 46 to activate orientation sensors 44 and distance sensor 42.

It should be understood that various types of view restricting means other than tube 40 presented above could be satisfactorily used to generate directed light ray 32. It should be further understood that various types of joints other than a ball and socket joint could be used to allow directed light ray 32 to rotate with respect to pivot point 30.

Without loss of generality, the origin of the coordinate system shown in FIG. 2, is located at pivot point 30 of light directing device 16, the X axis points forward along the longitudinal axis of vehicle 10, the Y axis is perpendicular thereto and vertical pointing up, and the Z axis is perpendicular to both axes X and Y, and points transversely to the left of the car as seen from above.

Referring again to FIG. 1, the coordinate system shown in FIG. 1 is the same coordinate system shown in FIG. 2. Vector 32 is the vector between the pivot point 30 of light directing device 16 and the driver's eyes' center point 27, when the driver is looking at light directing device 16. Vector 34 is the vector between the center point 36 of left mirror 20 and the driver's eyes' center point 27', when the driver is looking at mirror 20.

Light directing device 16 is regarded to be set correctly when light ray 32 is seen by the driver. Mirror 20 is considered to be set correctly when light rays 52 is reflected in the direction of the driver's eyes' center point 27' after hitting the center point 36 of mirror 20. In general, light ray 52 is a horizontal ray of light parallel to the longitudinal axis of vehicle 10. However, it could be a ray of other direction necessary to achieve a desired field of view for rearview vision purposes. Typically, the optimum direction of light rays 52 would be determined by the vehicle's manufacturer for each particular vehicle.

Figure 3:
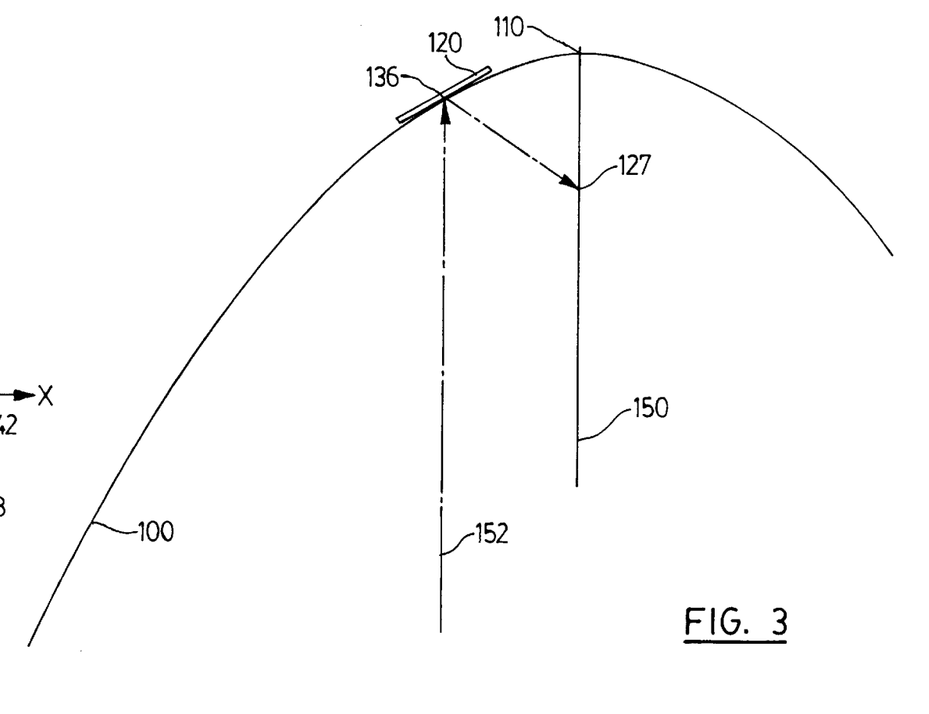
FIG. 3 is a diagram illustrating how a light ray travelling in the plane of a reflecting parabola, parallel to the parabola's axis, towards the parabola's focus and vertex (i.e. towards the concave side of the parabola) is reflected towards the parabola's focus.

Referring now to FIG. 3, from the definition of a parabola 100, it is known that a light ray 152 travelling in the parabola's plane, parallel to the parabola's axis 150, towards the parabola's focus 127 and vertex 110 (i.e. towards the concave side of the parabola), would be reflected towards the parabola's focus 127, if the parabola 100 were a mirror or light-reflecting. By (a) placing a mirror 120 perpendicular to the parabola's plane and tangent to the parabola 100 in the point 136 where the light ray 152 meets the parabola, and (b) by placing the driver's eyes at the parabola's focus 127, light ray 152 would be reflected towards the parabola's focus 127, that is towards the driver's eyes.

Referring again to FIG. 1, the above observation allows mirror 20 to be oriented so as to reflect light ray 52 towards the driver's eyes' center point 27'. The parabola having a focus located at driver's eyes' center point 27' and an axis parallel to unit vector 52, and inhabiting the plane formed by vectors 52 and 34, and containing the mirror center point 36, is used to determine the desired orientation of mirror 20, required to reflect light ray 52 towards center point 27': mirror 20 is oriented perpendicularly in mirror center point 36 to the plane formed by vectors 52 and 34 and containing the mirror center point 36, and tangent in mirror center point 36 to the above mentioned parabola.

Note: An elliptic (circular) paraboloid of axis unit vector 52, of focus at point 27' and containing mirror center point 36 on its surface, could have been used instead of the above mentioned parabola. Mirror 20 would then have to be oriented so as to be tangent in center point 36 to the paraboloid's surface.

Figure 4:
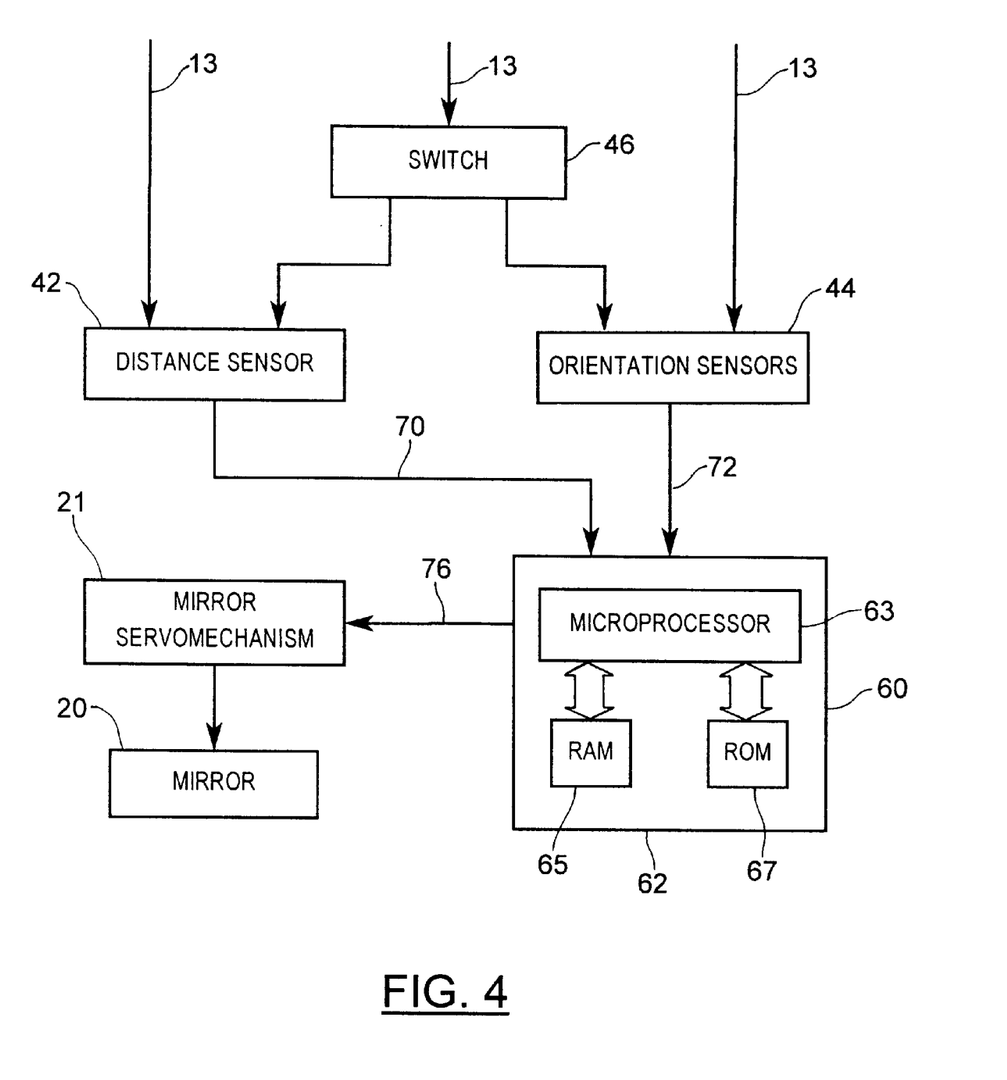
FIG. 4 is a block diagram of the components of the preferred embodiment.

Referring now to FIG. 4, electronic controller 60 preferably comprises microcomputer 62 located at a convenient location in vehicle 10, electrically coupled to the other components of the subject apparatus by cables or other electrical connections. Microcomputer 62 includes a microprocessor 63 having RAM memory 65 and ROM memory 67, in which is stored the coordinates of the center point 36, of mirror 20, as determined from vehicle dimensions and mirror locations. Similarly, light ray of vector 52 is stored in the ROM memory 67. Microcomputer 62 receives distance signal 70 from distance sensor 42, orientation signal 72 from orientation detector 44. Microprocessor 63 processes these signals in a manner hereinafter described, and generates output control signals 76 to mirror servomechanism 21.

Figure 5:
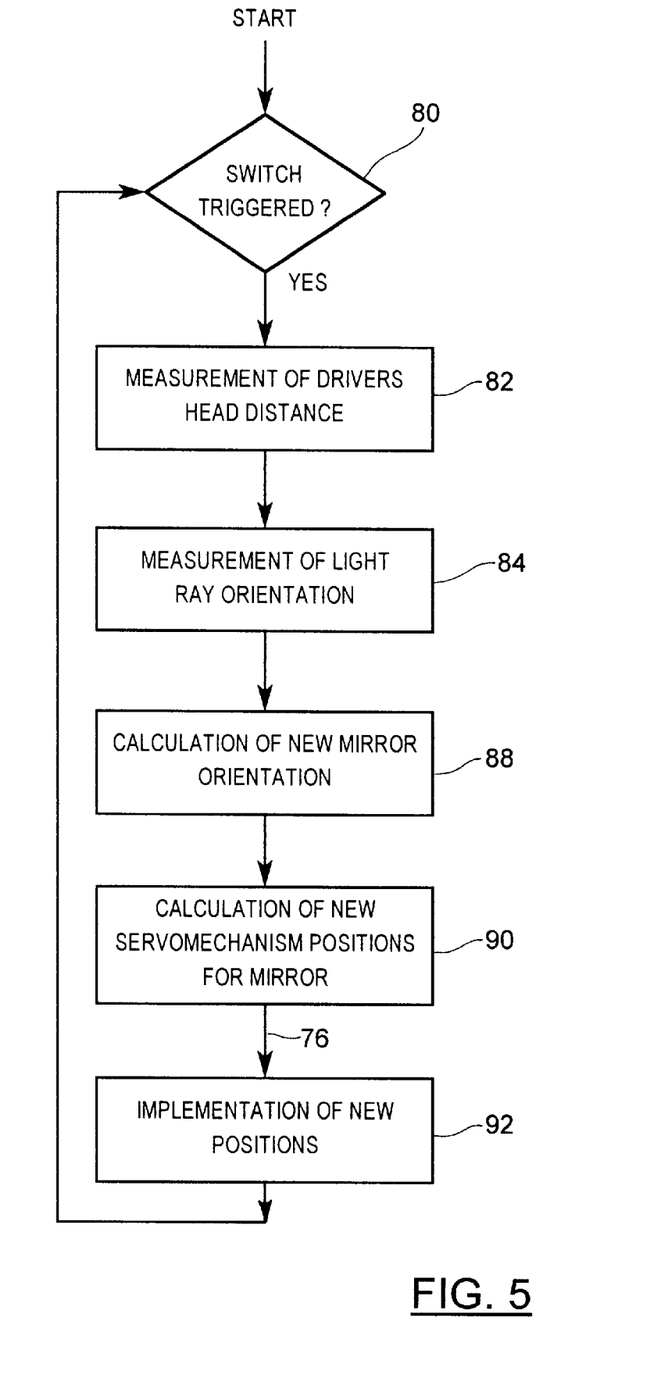
FIG. 5 is a flow chart of a program for the microcomputer shown in FIG. 4.

Referring now to FIG. 5, microcomputer 62 is programmed with computer software stored in ROM memory 67, which operates as follows. When switch 46 is triggered (block 80), distance sensor 42 and orientation sensors 44 make their measurements and send their output signals to microcomputer 62. Microcomputer 62 then determines the distance between light directing device 16 and driver's eyes center point 27 (block 82) and the orientation of the light ray 32 when seen by the driver (block 84). Microcomputer 62 subsequently determines the unit vector 58, the unit vector normal to left mirror (block 88) for mirror 20 to be either perpendicular in point 36 to the plane formed by vectors 52 and 34, and containing the mirror center point 36, and tangent in mirror center point 36 to the parabola of focus the driver's eyes' center point 27' and axis parallel to unit vector 52, and inhabiting the plane formed by vectors 52 and 34, and containing the mirror center point 36, or for mirror 20 to be tangent in the mirror center point 36 to the paraboloid of focus driver's eyes' center point 27' and axis parallel to unit vector 52. Microcomputer 62 then determines the new servomechanism positions for the left mirror (block 90), and generates output signals 76, which implement the new servomotor position (block 92).

Microcomputer 62 determines the required orientation of the mirror by implementing the following algorithm. Given:
(1) the coordinates of center points 36 (mirror), 30 (light directing device),
(2) the distance from the light directing device center 30 to the driver's eyes center point 27 provided by distance sensor 42,
(3) the orientation of the light ray 32 when seen by the driver, provided by orientation detector 44,
(4) the unit direction vectors for light rays 52, the unit vector 58 normal to the surface of mirror 20, is determined as follows:
 (a) Given the direction of vector 32, and knowing the distance from the light directing device center point 30 to the driver's eyes' center point 27, vector 32 is fully defined. Furthermore, knowing that vector 32 is perpendicular to the driver's head surface in driver's eyes' center point 27, the location of the rotation and tilt axes of driver's head 26 are uniquely defined.
 (b) The driver's head 26 is virtually rotated and tilted so that a line normal to the surface of the driver's head and extending from the driver's eyes' center point 27', contains mirror center point 36, thereby defining vector 34.
 (c) Given the coordinates of the mirror center point 36 and the new coordinates of the driver's eyes' center point 27', the parabola inhabiting the plane formed by vectors 52 and 34 and containing mirror center point 36, of focus the driver's eyes' center point 27', of axis parallel to unit vector 52, and containing the mirror center point 36 is uniquely defined.
 (d) The orientation of mirror 20, placed so as to be perpendicular in the mirror center point 36 to the plane formed by vectors 52 and 34 and containing mirror center point 36, and tangent in the mirror center point 36 to the above mentioned parabola, is calculated in the form of normal unit vector 58.

The above steps may be similarly repeated for any other mirror considered to determine the corresponding unit vector normal to the mirror's surface.

In use, the driver manually adjusts light directing device 16 so that light ray 32 is visible by the driver. Driver 12 then presses switch 46, which activates distance sensor 42, which measures the distance between the light directing device 16 and the driver's eyes' center point 27. Switch 46 also activates orientation sensors 44 which measures the orientation of light directing device 16. The signals from distance sensor 42 and orientation sensors 44 are processed by microcomputer 62 to determine the coordinates of driver's eyes' center points 27 and 27' and calculates the normal unit vector 58, which define the orientation of mirror 20. Position control signals are then generated by microcomputer 62 to activate servomechanism 21 which reposition mirror 20 so that its surface is normal to vectors 58.

Figure 6:
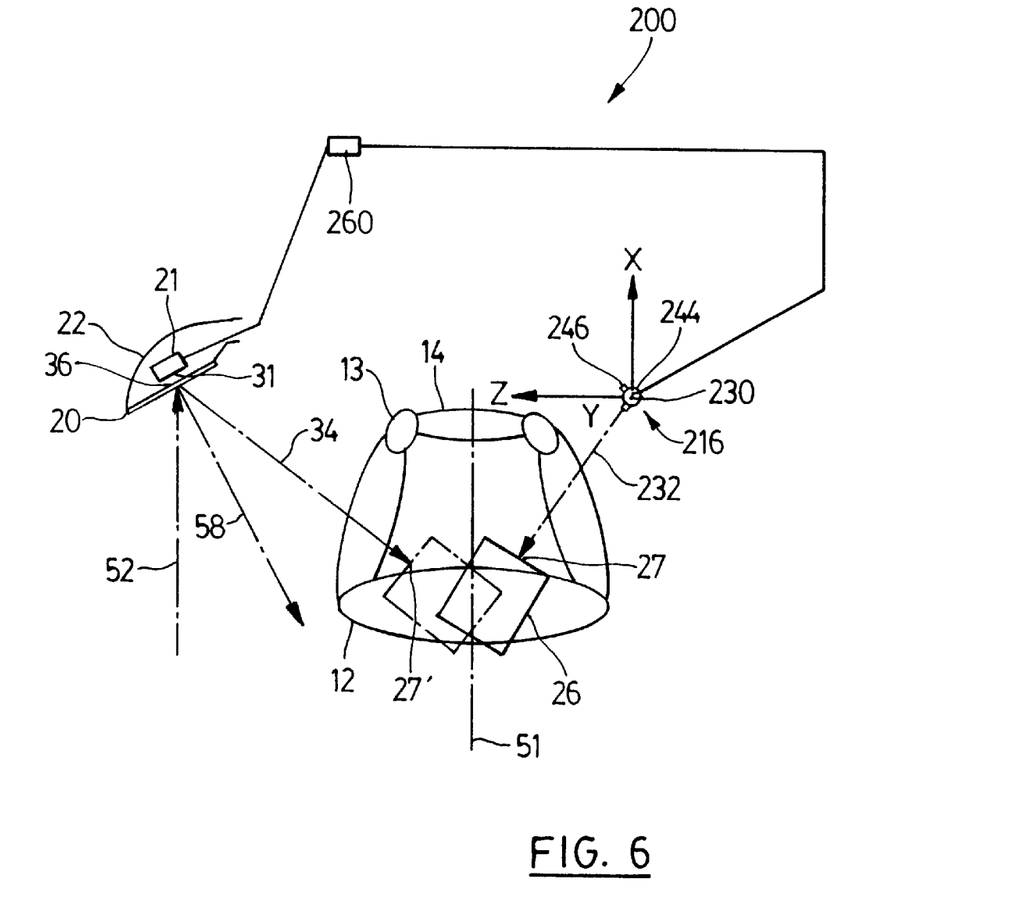
FIG. 6 is a schematic top plan view of an alternative embodiment of the invention.

Referring now to FIG. 6, in an alternative embodiment, the subject apparatus shown generally as 200 is based upon the assumption that the driver will tend to assume a driving position directly behind steering wheel 14, such that the driver's eyes' center point falls within a vertical plane 51 extending longitudinally to the axis of vehicle through the middle of the driver's seat, when the driver is looking straight ahead.

Apparatus 200 comprises light directing device 216, orientation detector 244, switch 246, electronic controller 260, and servomechanism 21 or adjusting the position of mirror 20. Orientation detector 244 detects the orientation of the light ray 232 respectively, once light directing device 216 is manually adjusted and switch 246 is activated. Electronic controller 260 includes microcomputer 262 programmed to perform a triangulation algorithm, which provides the control signals for properly orienting the mirror 20.

In use, driver 12 adjusts light directing device 216 so that light ray 232 is visible by the driver, and presses switch 246, which results in apparatus 200 automatically adjusting mirror 20. An advantage of this alternative embodiment of the invention is that apparatus 200 does not require distance sensors for sensing the distance between the light directing device and the driver's eyes 27.

In this embodiment, light directing device 216 must be located in the vehicle so that center 230 does not lie within vertical plane 51.

Microcomputer 262 determines the orientation of mirror 20 by implementing the following algorithm. Given:
(1) the coordinates of center points 36 (mirror), 230 (light directing device) and the lateral position of the driver's seat longitudinal center plane 51,
(2) the orientation of the light ray 232 when seen by the driver, provided by orientation detector 244,
(3) the unit direction vectors for light ray 52, the unit vector 58 normal to the surface of passenger side mirror 20 (or other mirror) is determined as follows:
 (a) Given the direction of vector 232, knowing that vector 232 is perpendicular to the driver's head surface in driver's eyes' center point 27, and assuming that the rotation axis lies in the driver's seat longitudinal center plane 51, the location of the rotation and tilt axes of driver's head 26 are uniquely defined.
 (b) The driver's head 26 is virtually rotated and tilted so that a line normal to the surface of the driver's head and extending from the driver's eyes' center pont 27', contains mirror center point 36, thereby defining vector 34.
 (c) Given the coordinates of the mirror center point 36 and the coordinates of the driver's eyes' center point 27', the parabola inhabiting the plane formed by vectors 52 and 34 and containing mirror center point 36, of focus the driver's eyes' center point 27', of axis parallel to unit vector 52, and containing the mirror center point 36 is uniquely defined.

(d) The orientation of mirror 20, placed so as to be perpendicular in the mirror center point 36 to the plane formed by vectors 52 and 34 and containing mirror center point 36, and tangent in the mirror center point 36 to the above mentioned parabola, is calculated in the form of normal unit vector 58.

The above steps may be similarly repeated for any other mirror considered to determine the corresponding unit vector normal to the mirror's surface.

Figure 7:
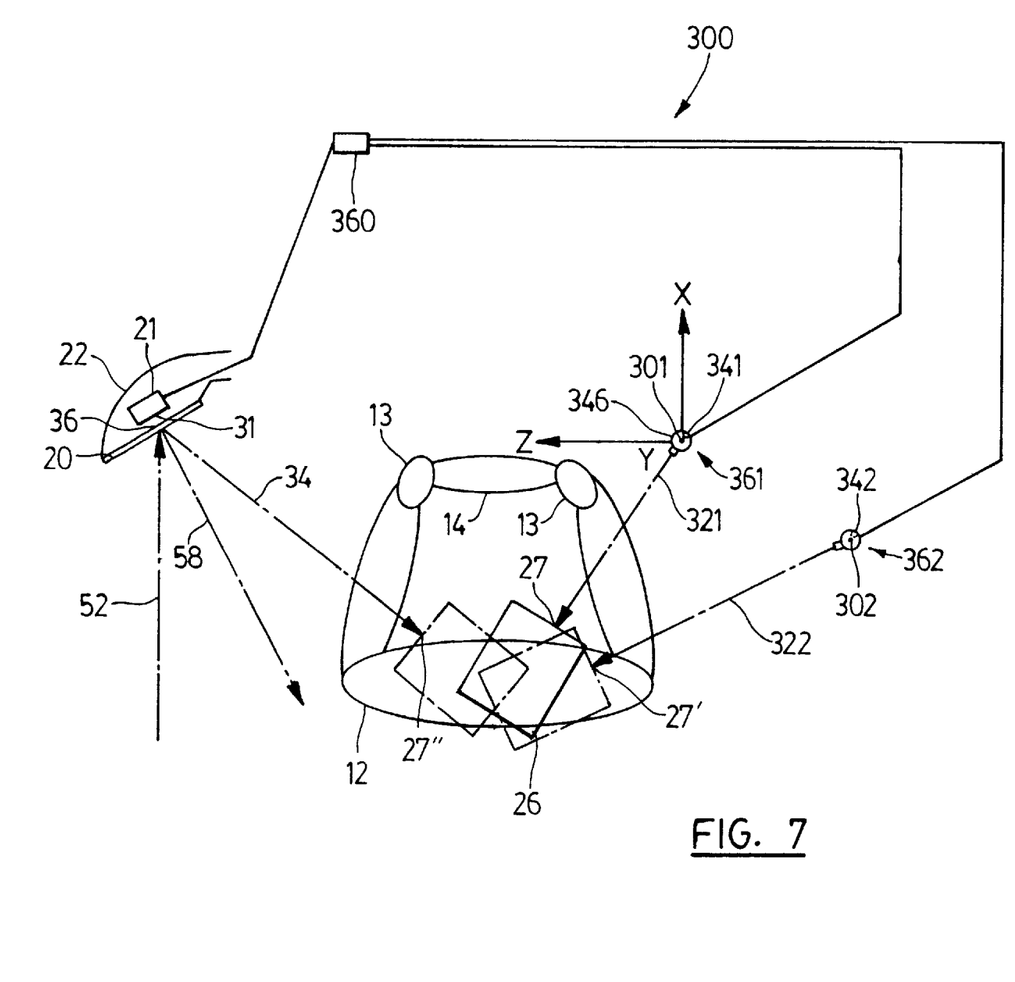
FIG. 7 is a schematic top plan view of a second alternative embodiment of the invention.

Referring now to FIG. 7, in a second alternative embodiment, the subject apparatus shown generally as 300 is adapted to allow the driver to adjust manually both a first light directing device 361 and a second light directing device 362. Once these adjustments are performed, apparatus 300 then automatically adjusts mirror 20. In this embodiment, first light directing device 361 and the second light directing device 362 must be located so that light rays 321 and 322 are separated, and spaced far enough from one another, to allow the above mentioned triangulation algorithm to be performed accurately.

Apparatus 300 also comprises a first orientation detector 341, a second orientation detector 342, switch 346, electronic controller 360, and servomechanism 21 for adjusting the position of mirror 20. Orientation detectors 341, 342 detect the orientation of light rays 321 and 322 respectively, once light directing devices 361 and 362 are manually adjusted, and switch 346 is activated. Electronic controller 360 includes microcomputer 362 programmed to perform a triangulation algorithm, which provides the control signals for properly orienting the mirror 20.

In use, the driver adjusts both first light directing device 361 and second light directing device 362 so that both light rays 321 and 322 are visible by the driver, and presses switch 346, which results in apparatus 300 automatically adjusting mirror 20. An advantage of this alternative embodiment of the invention is that apparatus 300 does not require distance sensors for sensing the distance between the light directing device and the driver's eyes' center point 27.

Microcomputer 362 determines the orientation of mirror 20 by implementing the following algorithm. Given:
(1) the coordinates of center points 36 (mirror), 301 (first light directing device) and 302 (second light directing device),
(2) the orientation of the light rays 321, 322 when seen by the driver, provided by orientation detector 341 and 342 respectively,
(3) the unit direction vectors for light rays 52, the unit vector 58 normal to the surface of mirror 20 is determined as follows:
  (a) Given the direction of vector 321 and knowing that vector 321 is perpendicular to the driver's head surface in driver's eyes' center point 27 when looking at first light directing device 361, given the direction of vector 322 and knowing that vector 321 is perpendicular to the driver's head surface in driver's eyes' center point 27' when looking at second light directing device 362, the location of the rotation and tilt axes of driver's head 26 are uniquely defined.
  (b) The driver's head 26 is virtually rotated and tilted so that a line normal to the surface of the driver's head and extending the driver's eyes' center point 27", contains mirror center point 36, thereby defining vector 34.
  (c) Given the coordinates of the mirror center point 36 and the coordinates of the driver's eyes' center point 27", the parabola inhabiting the plane formed by vectors 52 and 34 and containing mirror center point 36, of focus the driver's eyes' center point 27", of axis parallel to unit vector 52, and containing the mirror center point 36 is uniquely defined.
  (d) The orientation of mirror 20, placed so as to be perpendicular in the mirror center point 36 to the plane formed by vectors 52 and 34 and containing mirror center point 36, and tangent in the mirror center point 36 to the above mentioned parabola, is calculated in the form of normal unit vector 58.

The above steps may be similarly repeated for any other mirror considered to determine the corresponding unit vector normal to the mirror's surface.

While the subject apparatus orients a mirror based on the location of the driver's eyes' center point, if the mirror orientation computed is not physically achievable, due for example to the physical constraints of the mirror positioning means, the controller can be programmed to notify the driver of this impossibility by some signal such as a light or a sound.

While the preferred embodiment is illustrated for use with one mirror, it should be understood that the subject apparatus can be used in conjunction with any number of mirrors located inside or outside the vehicle. Further, while the light directing device is described as being directly manually adjusted by the driver, it could as well be indirectly manually adjusted by operating a mechanical joystick or a switch for a servomechanism.

While the apparatus has been shown to be triggered by a switch, it could also be triggered by a change of orientation of the directed light ray with respect to the coordinate system, caused by the driver adjusting the light directing device. Also, the intensity of light emanating from the light directing device could be made adjustable to match various driving conditions such as daylight, night, overcast, etc.

Further, while three embodiments of the apparatus have been described, a combination of these embodiments is also possible, especially in order to determine for error checking purposes, whether the location of the driver's eyes' center point as determined by one embodiment matches the location of the driver's eyes' center point as determined by another embodiment. Still further, while the apparatus orients a mirror based on the location of the driver's eyes' center point, the location of the driver's eyes can be located by modelling the driver's head as a single point or by modelling the driver's eyes as a single point within the driver's head, and the mirrors oriented accordingly as described herein.

It should therefore be understood that various modifications can be made to the preferred embodiment described and illustrated therein, without departing from the subject invention, the scope of which is defined in the appended claims.

I claim:

1. Apparatus for adjusting the orientation of at least one rearview mirror on a vehicle, comprising:
  (a) light directing means movably mounted to the vehicle for directing a visible light ray at the eyes of a driver;
  (b) orientation detecting means coupled to the light directing means for detecting the orientation of the visible light ray relative to a point and generating orientation signals correlatable therewith;
  (c) distance sensing means located proximate the light directing means for sensing the distance between the point and the driver's eyes along the path of the visible light ray and generating distance signals correlatable therewith;

(d) control means operatively coupled to the orientation detecting means and the distance sensing means for determining an orientation for the mirror based upon the distance signals, the orientation signals and vehicle parameters, and for generating control signals correlatable therewith; and (e) mirror positioning means responsive to the control signals for positioning the mirror to achieve the determined orientation for the mirror.

2. The apparatus defined in claim 1, wherein the light directing means comprises a light source and view restriction means for restricting the driver from viewing the light source when the light source is not directed at the driver's eyes.

3. The apparatus defined in claim 2, wherein the view restriction means comprises a narrow non-transparent tube pivotally mounted in a mount for pivotal movement about the point, the tube having an open free end and a closed end, the light source being located in the tube near the closed end thereof.

4. The apparatus as defined in claim 1, also comprising activation means operable by the driver for activating the orientation detecting means and the distance sensing means.

5. The apparatus defined in claim 4, wherein the activation means comprises a manually operated switch located proximate the light directing means.

6. The apparatus defined in claim 1, wherein the control means comprises an electronic controller including a microcomputer having storage means for storing parameters, input means for receiving input signals generated by the distance sensing means and the orientation detecting means, processing means for determining the orientation for the mirror based upon the input signals and the parameters, and output means for generating control signals correlatable with the determined orientation for the mirror.

7. The apparatus defined in claim 1, wherein the vehicle parameters comprise coordinates of center points of the light directing means and of the mirror.

8. The apparatus defined in claim 7, wherein the vehicle parameters comprise vehicle dimensions and angles for light rays reflected from the mirror which result in a field of view suitable for rearview vision purposes.

9. The apparatus defined in claim 8, wherein the criteria comprise direction vectors for light rays parallel to the longitudinal axis of the vehicle.

10. The apparatus defined in claim 1, wherein the distance sensing means comprises an infrared sensor mounted on the light directing means.

11. The apparatus defined in claim 1, wherein the distance sensing means comprises an ultrasound sensor mounted on the light directing means.

12. The apparatus defined in claim 1, wherein the mirror positioning means comprises a servomechanism coupled to the mirror.

13. The apparatus defined in claim 1, wherein the light directing means comprises a light emitting diode.

14. The apparatus defined in claim 1, wherein the control means determines the orientation of the mirror by utilizing a parabola having a focus located at the driver's eyes and an axis parallel to a rearview vector representing a desired rearview sightline, and falling in a plane formed by the rearview vector and a vector extending between the mirror and the driver's eyes when the driver is looking at the mirror, and containing the center point of the mirror.

15. The apparatus defined in claim 1, wherein the control means comprises:

(a) means for determining a first vector extending between the center point of the light directing means and the driver's eyes;

(b) means for determining the coordinates of the driver's eyes;

(c) means for determining a second vector between the driver's eyes and the coordinates of the mirror; and (d) means for determining a unit vector related to the second vector necessary to achieve the determined orientation for the mirror.

16. The apparatus defined in claim 1, wherein the control means models the driver's head as a rectangular parallelepiped having a front side corresponding to the driver's face, and the driver's eyes are modelled as a center point on the front side midway between the eyes on the driver's face.

17. Apparatus for automating the rearview mirror orientation of at least one mirror on a vehicle, comprising:

(a) a first light directing means mounted for rotational movement about a first point in a frame of reference for directing a visible light ray at the eyes of a driver;

(b) a second light directing means mounted for rotational movement about a second point spaced from the first point for directing a second visible light ray at the driver's eyes;

(c) a first orientation detecting means coupled to the first light directing means for detecting an angular orientation of the first light ray relative to the first point and generating first orientation signals correlatable therewith;

(d) a second orientation detecting means coupled to the second light directing means for detecting an angular orientation of the second light ray relative to the second point and generating second orientation signals correlatable therewith;

(e) control means operatively coupled to the first orientation detecting means and the second orientation detecting means for determining an orientation for the mirror as a function of both the first orientation signals and the second orientation signals, and vehicle parameters, and for generating control signals correlatable therewith; and (f) mirror positioning means responsive to the control signals for positioning the mirror to achieve the determined orientation for the mirror.

18. The apparatus defined in claim 17, wherein the first light directing means and the second light directing means each comprise a light source and view restriction means for restricting the driver from viewing the light source when the light source is not directed at the driver's eyes.

19. The apparatus defined in claim 17, also comprising activation means for activating the first orientation detecting means and the second orientation detecting means after the light directing means have been adjusted by a driver.

20. The apparatus defined in claim 17, wherein the control means comprises computer processing means for determining unit vectors normal to the mirror surface necessary to achieve the determined orientation for the mirror.

21. Apparatus for automating the rearview mirror orientation of at least one mirror on a vehicle, comprising:

(a) light directing means mounted for rotational movement about a point in a frame of reference for directing a visible light ray at the eyes of a driver;

(b) orientation-detecting means coupled to the light directing means for detecting the angular orientation of the visible light ray relative to the point and generating orientation signals correlatable therewith;

(c) control means operatively coupled to the orientation detecting means for determining an orientation for the mirror, and for generating control signals correlatable therewith, wherein the control means models the driver's head as a rectangular parallelepiped having a front side corresponding to the driver's face and the driver's eyes as a center point on the front side of the parallelepiped, the parallelepiped being rotatable and tiltable about the driver's body, and wherein the control means determines the desired orientation as a function of the orientation signals, vehicle parameters, the parallelepiped, and an imaginary longitudinal plane extending through a middle of a driver's seat; and (d) mirror positioning means responsive to the control signals for positioning the mirror in a selected orientation.

22. The apparatus defined in claim 21, wherein the control means comprises computer processing means for determining unit vectors normal to the mirror surface necessary to achieve the said orientation for the mirror.

23. A method for adjusting the orientation of at least one rearview mirror on a vehicle comprising the steps of:

(a) directing a visible light ray emanating from a light directing device movably mounted to the vehicle at the eyes of a driver;

(b) detecting the orientation of the visible light ray relative to a point and generating orientation signals correlatable therewith, (c) sensing the distance between the point and the driver's eyes approximately along the path of the visible light ray and generating distance signals correlatable therewith, (d) determining an orientation for the mirror based upon the orientation signals, the distance signals and vehicle parameters, and generating control signals correlatable therewith; and (e) positioning the mirror based upon the control signals to achieve the determined orientation for the mirror.

24. The method defined in claim 23, wherein the orientation for the mirror is determined by utilizing a parabola having a focus located at the driver's eyes and an axis parallel to a rearview vector representing a desired rearview sightline, and falling in a plane formed by a rearview vector and a vector extending between the mirror and the driver's eyes when the driver is looking at the mirror, and containing a center point of the mirror.

25. A method for adjusting the orientation of at least one rearview mirror on a vehicle comprising the steps of:

(a) directing a visible light ray emanating from a light directing device movably mounted to the vehicle at the eyes of a driver;

(b) detecting the orientation of the visible light ray relative to a point and generating orientation signals correlatable therewith;

(c) determining an orientation for the mirror and generating control signals correlatable therewith, by modelling the driver's head as a rectangular parallelepiped having a front side corresponding to the driver's face, and the driver's eyes as a center point on the front side of the parallelepiped, the parallelepiped being rotatable and tiltable about the driver's body, and determining a desired orientation as a function of the orientation signals, vehicle parameters, and the parallelepiped; and (d) positioning the mirror based upon the control signals to achieve the determined orientation for the mirror.

* * * * *